July 28, 1936.  C. J. HALEY  2,049,371
STAVE JOINT
Filed Aug. 26, 1935
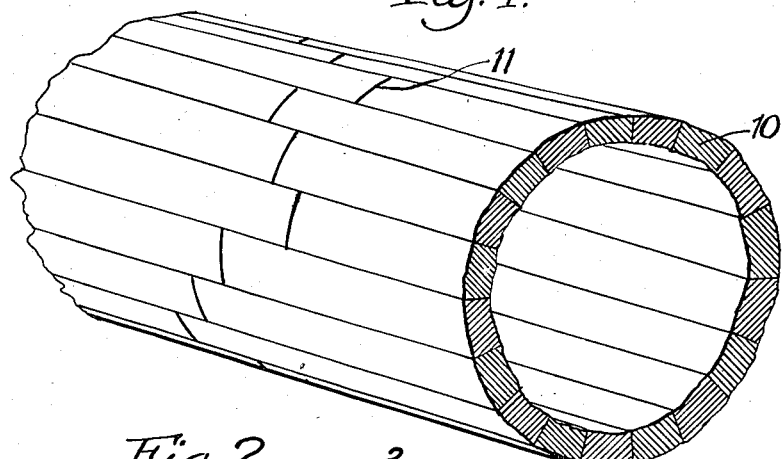
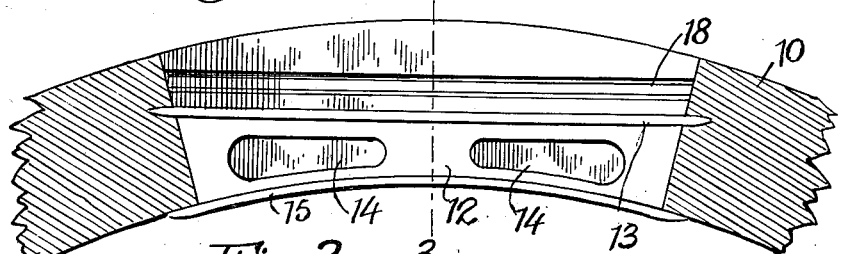
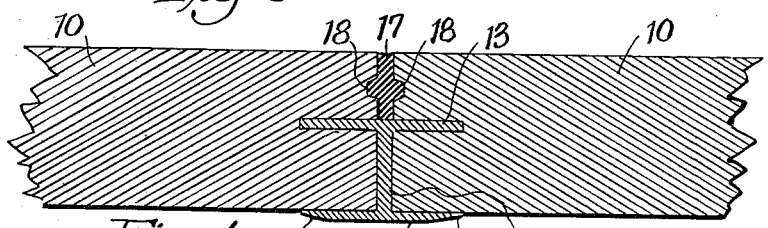
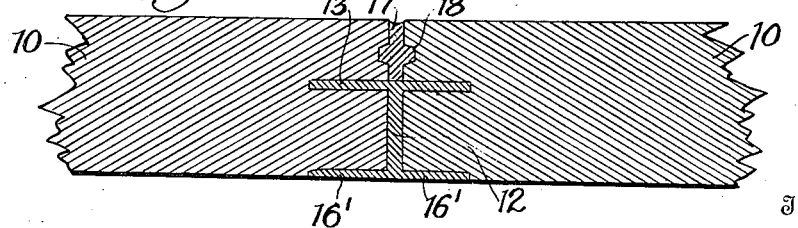
Inventor
Christopher J. Haley
By F. W. Dahn,
Attorney Patented July 28, 1936

2,049,371

UNITED STATES PATENT OFFICE 2,049,371

STAVE JOINT

Christopher J. Haley, Vancouver, British Columbia, Canada

Application August 26, 1935, Serial No. 37,991

5 Claims. (Cl. 138—79)

My invention relates to a stave joint, such as is found in flumes, which are open trough-like conveyors for fluids (usually water); in various sorts of pipes, conduits and culverts, which are closed conveyors for liquids and which are usually more or less cylindrical in section; in tanks or like vessels, generally used for holding liquids such as water without pressure other than static head; and in silos and the like.

It is an object of the invention to provide a joint which shall protect the butt ends of the staves in a manner more effective than any heretofore known against the destructive action of the weather, the main agents of destruction being the decay occasioned by dampness, augmented by drying and consequent checking or warping which facilitates further entry of moisture, and also assisted in cold climates by the freezing of such moisture, particularly in cases where it occurs as pocketed water. Even a mere film of moisture is sufficient to hasten decay when repeatedly absorbed and expelled by atmospheric changes. Absorbed moisture also causes swelling, followed by shrinking as the moisture is expelled, and this swelling and shrinking renders many efforts futile which have been made to protect butt joints by means of devices formed to envelop the butts of staves. Such devices have generally been made of iron, and this is undesirable for the reason that the wood disintegrates rapidly when in contact with iron and then exposed to damp atmosphere.

A further object of my invention, therefore, is to provide a stave joint in which the connecting means is effectively protected against the effects of damp atmosphere.

Another object of my invention is to provide a joint in which there is provided means to prevent leakage of the contained liquid, combined with means to protect the leak-preventing means against the internal pressure of the contained liquid.

Another object of the invention is to prevent seam leaks adjacent the abutting ends of staves.

Another object of the invention is to provide a structure that shall be effective in holding in place packing which excludes external moisture. Staves used in making flumes or pipes are commonly about twenty feet in length, whereas the flumes or pipes vary in length from a few hundred feet to many thousand feet. Builders of such structures aim to have the butts of the staves in contact at the abutting ends, but it is impracticable to do this precisely, for the reason that they must follow the contour of rivers, hillsides, grades, etc. Hence the butt joints are frequently and unavoidably as far apart as one-eighth of an inch, so that water enters and rots the wood, besides freezing in localities where freezing occurs all of which causes speedy deterioration at the joints although the intermediate portions of the staves may be entirely sound after the joints have become so badly rotted as to interfere seriously with the usefulness of the structure. The most commonly used butt connector consists of a plain tongue about one-eighth inch by one and one-half inches. If the joints are not close this permits the external wood to decay very quickly and as the tongue is exposed to the internal pressure this pressure has a disastrous effect on the butt joints as soon as the wood exterior to the joint becomes unsound.

Referring to the drawing, which is made a part hereof, and in which similar reference characters indicate similar parts:

Fig. 1 is a perspective of a pipe in which my device is or may be used, illustrating the relative positions of joints, Fig. 2, a transverse section of a joint, on an enlarged scale, Fig. 3, a section on line 3—3 of Fig. 2, and Fig. 4, a similar view, showing a modified form.

In the drawing, reference character 10 indicates the staves of a pipe having joints 11 variously spaced along the same or "broken" as is usual in the art. The adjacent ends of the staves are separated by the webs 12 of connectors having tongues 13, preferably but not necessarily straight as shown in Fig. 2; i. e., forming chords of an arc of a circle concentric with the arc of the outer surface of the stave if the same is formed in the usual manner with a rounded or arcuate outer surface, as in Fig. 2. These tongues extend into correspondingly shaped recesses in the ends of adjacent staves and preferably fit closely therein. At their ends the tongues extend beyond the side faces of the staves, which faces are commonly radial as shown in Fig. 2, and into the wood of the staves parallel to those connected by the tongues, so as to seal the seams between parallel staves adjacent to the butt joints and thus to prevent seam leaks at these points, whereby liquid might be forced into the joints beyond the tongues 13 due to the internal pressure. It may be noted that the webs may have openings as at 14, to decrease their weight, if desired.

An internal flange 15, extending to both sides of the web 12, serves to seal the joint and to prevent the internal pressure from acting on the tongues 13. Preferably this flange fits closely against the interior of the flume or pipe or other structure, as is feasible for the reason that the interior surfaces are usually fairly accurately shaped and, of course, these surfaces are not exposed to changes of shape due to alternate wetness and dryness, or at least they are very little exposed to such changes. As shown in Fig. 2, these flanges preferably extend over the seams between parallel staves so as to protect the seams from internal pressure adjacent the butt joints. They are also preferably beveled as indicated at 16 so as to permit any solid bodies that may pass along the flume, etc., to pass by readily.

The space radially outward from the web 12 is filled with packing 17, in the preferred form of the invention, which packing may consist of pitch, oakum, wool lead, etc., or of a plastic suitable for the purpose of repelling moisture against entry between the ends of the staves. In other forms of butt joint connections with which I am familiar it is impracticable to calk the open ends, there being no uniformity in the openings, many of which are too small to permit effective calking, yet being open sufficiently to admit moisture and so to institute the wetting and drying process hereinbefore referred to, with consequent bad effects. To insure the packing against accidental removal I preferably provide what I call an "anchorage groove" at 18 in the end of each of the abutting staves, whereby the packing is anchored in place. This groove is preferably parallel to the recess for the tongue 13 for convenience of construction, though it might be otherwise shaped.

In the modified form of the invention shown in Fig. 4 all the parts of the joint may be as previously described, except that the flanges 16', 16' are of uniform thickness to their outer edges and are embedded in undercut portions of the respective staves.

It will be obvious to those skilled in the art that numerous changes may be made in the device of my invention all without departing from the spirit and intent of the same, and therefore I do not limit myself to what is shown in the drawing and described in the specification, but only as indicated in the appended claims. It will be obvious also that the packing or calking arrangement herein disclosed may be used with other forms of connecting means, if only there is a substantially tight joint at the inside of the pipe or other device and a circumferentially extending slot at the outside. It will be obvious also that, while straight tongues 13 and straight transverse slots across the ends of the staves to receive such tongues will usually be preferred, it is within the scope of my invention to make the slots and the corresponding tongues of other forms; e. g., concentric with the pipe, or on curves not concentric therewith, etc.

Having thus fully described my said invention, what I claim is:

1. In a stave joint, a pair of staves having abutting ends, a web separating the ends of said staves, tongues on said web entering grooves remote from the inner and outer faces of said staves, said tongues extending beyond the side faces of said staves to seal the seams alongside said staves, flanges extending laterally from said web, said flanges lying against the inner faces of said staves and extending over the seams adjacent thereto, and packing between the ends of said staves beyond said web, the ends of the staves having anchoring grooves to hold said packing in place.

2. In a stave joint, a pair of staves having abutting ends, connecting means therefor comprising a web spacing said ends, tongues on said web entering grooves in the ends of said staves, packing in the joint beyond said web, and means for anchoring said packing in place.

3. In a stave joint, a pair of alined staves spaced apart at their outer sides to provide an outwardly opening slot, said staves having recesses extending widthwise of their spaced-apart faces, and packing in said slot, the packing extending into said recesses to anchor the packing in the slot.

4. In a stave joint, a pair of staves having abutting ends, a butt joint therefor comprising a web between the ends of said staves, said web terminating at a substantial distance from the outer faces of the staves so as to leave a slot between them, tongues on said web entering grooves or recesses remote from the inner and outer faces of the staves, and packing in said slot.

5. Means for joining the adjacent ends of staves, comprising a web adapted to be positioned between said ends, flanges at one edge of said web adapted to extend over the inner walls of said staves, and tongues at the opposite edge of said web adapted to enter recesses in the ends of said staves remote from the inner and outer walls of the staves, whereby space to receive packing material is left between the ends of said staves beyond said web.

CHRISTOPHER J. HALEY.